(12) United States Patent
Lin et al.

(10) Patent No.: US 11,419,130 B2
(45) Date of Patent: Aug. 16, 2022

(54) RESOURCE ALLOCATION METHOD AND APPARATUS

(71) Applicant: CHINA ACADEMY OF TELECOMMUNICATIONS TECHNOLOGY, Beijing (CN)

(72) Inventors: Lin Lin, Beijing (CN); Rui Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 310 days.

(21) Appl. No.: 16/497,429

(22) PCT Filed: Mar. 21, 2018

(86) PCT No.: PCT/CN2018/079888
§ 371 (c)(1),
(2) Date: Sep. 24, 2019

(87) PCT Pub. No.: WO2018/171638
PCT Pub. Date: Sep. 27, 2018

(65) Prior Publication Data
US 2021/0282159 A1    Sep. 9, 2021

(30) Foreign Application Priority Data
Mar. 24, 2017    (CN) .......................... 201710184471.6

(51) Int. Cl.
*H04W 72/12* (2009.01)
*H04W 24/10* (2009.01)
(Continued)

(52) U.S. Cl.
CPC ......... *H04W 72/121* (2013.01); *H04W 24/10* (2013.01); *H04W 72/02* (2013.01);
(Continued)

(58) Field of Classification Search
CPC ..... H04W 28/0289; H04W 4/40; H04W 4/46; H04W 72/0453; H04W 72/12;
(Continued)

(56) References Cited

U.S. PATENT DOCUMENTS

2017/0188397 A1\* 6/2017 Liang ................ H04W 72/0453
2018/0227802 A1\* 8/2018 Lehmann .................. H04L 1/00
(Continued)

FOREIGN PATENT DOCUMENTS

CN      105307216 A     2/2016
CN      105491667 A     4/2016
(Continued)

OTHER PUBLICATIONS

NEC: "Load balancing via dynamic resource sharing for multiple carriers and pools", 3GPP TSG RAN WG1 Meeting #87; R1-1611722, Reno, USA; Nov. 14, 2016-Nov. 18, 2016.
(Continued)

*Primary Examiner* — Margaret G Mastrodonato
(74) *Attorney, Agent, or Firm* — Kilpatrick Townsend & Stockton, LLP

(57) ABSTRACT

The present invention discloses a resource allocation method and apparatus for resolving a technical issue of a conflict of transmission resources used by user equipment adopting mode 3 and user equipment adopting mode 4. The method comprises: a base station determining whether a shared transmission resource pool shared by first-mode user equipment and second-mode user equipment includes available resources, wherein a transmission resource of the first-mode user equipment is allocated by the base station, and a transmission resource of the second-mode user equipment is selected from the shared transmission resource pool; and if the base station determines that the shared transmission resource pool includes available resources, the base station
(Continued)

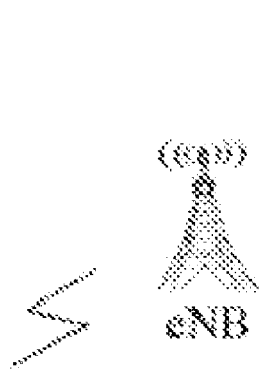

allocating, on the basis of the available resources, a transmission resource to the first-mode user equipment.

16 Claims, 1 Drawing Sheet

(51) Int. Cl.
*H04W 72/02* (2009.01)
*H04W 72/04* (2009.01)
*H04W 88/06* (2009.01)

(52) U.S. Cl.
CPC ....... *H04W 72/044* (2013.01); *H04W 72/048* (2013.01); *H04W 72/1226* (2013.01); *H04W 88/06* (2013.01)

(58) Field of Classification Search
CPC .............. H04W 28/0284; H04W 72/02; H04W 72/044; H04W 72/121; H04W 72/1226; H04W 24/10; H04W 72/048; H04W 88/04; H04W 88/06
See application file for complete search history.

(56) References Cited

U.S. PATENT DOCUMENTS

| | | | | |
|---|---|---|---|---|
| 2018/0234973 A1* | 8/2018 | Lee | ................... | H04W 72/0446 |
| 2019/0082421 A1* | 3/2019 | Sartori | ............. | H04W 74/0808 |
| 2019/0182840 A1* | 6/2019 | Feng | ....................... | H04W 4/44 |
| 2019/0313279 A1* | 10/2019 | Li | ..................... | H04W 28/0289 |
| 2019/0394786 A1* | 12/2019 | Parron | ................ | H04L 27/0006 |
| 2021/0289474 A1* | 9/2021 | Wang | .................... | H04W 72/02 |

FOREIGN PATENT DOCUMENTS

| | | |
|---|---|---|
| CN | 105979598 A | 9/2016 |
| CN | 106060947 A | 10/2016 |
| CN | 106376088 A | 2/2017 |
| CN | 106507449 A | 3/2017 |
| JP | 2015536053 A | 12/2015 |
| JP | 2017506037 A | 2/2017 |
| JP | 2017513243 A | 5/2017 |
| WO | 2011055957 A3 | 10/2011 |
| WO | 2013109960 | 7/2013 |
| WO | 2015093560 A1 | 6/2015 |
| WO | 2017041856 A1 | 3/2017 |

OTHER PUBLICATIONS

Huawei Hisilicon: "Congestion Control for PC5-based V2X", 3GPP TSG RAN WG2 Meeting #96; R2-167935, Reno, USA: Nov. 14, 2016-Nov. 18, 2016.

ZTE: "Detailed signalling design for CBR measurement and reporting", 3GPP TSG RAN WG2 Meeting #97 R2-1700789, Athens, Greece; Feb. 13, 2017-Feb. 17, 2017.

NEC: "Discussions on congestion control in distributed scheduling mode", 3GPP TSG RAN WG1 Meeting #86bis; R1-1609141, Lisbon, Portugal; Oct. 10, 2016-Oct. 14, 2016.

* cited by examiner

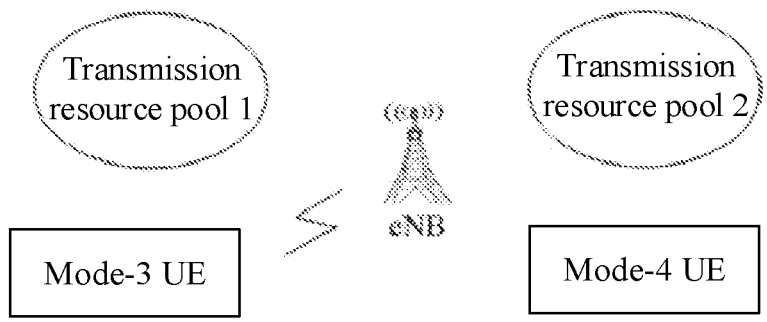

Fig. 1

```
201  An eNB determines whether there are available resources in a
     shared transmission resource pool by UEs in a first mode and
     UEs in a second mode, where transmission resources of the UEs
     in the first mode are allocated by the eNB, and transmission
     resources of the UEs in the second mode are selected by the UEs
     in the second mode from the shared transmission resource pool 202  When the eNB determines that there are available resources in
     the shared transmission resource pool, then the eNB allocates
     transmission resource for one or more UEs in the first mode
     based on the available resources
```

Fig. 2

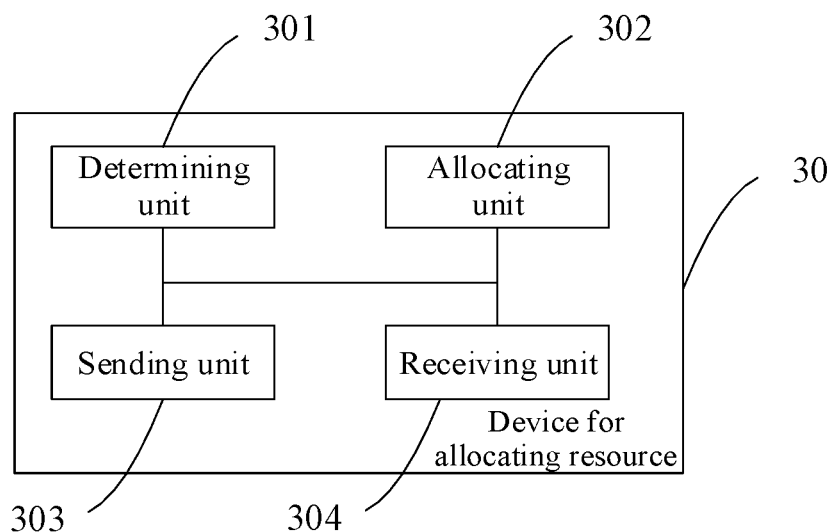

Fig. 3

RESOURCE ALLOCATION METHOD AND APPARATUS

This application is a US National Stage of International Application No. PCT/CN2018/079888, filed Mar. 21, 2018, which claims priority to Chinese Patent Application No. 201710184471.6, filed with the Chinese Patent Office on Mar. 24, 2017, and entitled "Method and device for allocating resource", which is hereby incorporated by reference in its entirety.

This application claims priority to Chinese Patent Application No. 201710184471.6, filed with the Chinese Patent Office on Mar. 24, 2017, and entitled "Method and device for allocating resource", which is hereby incorporated by reference in its entirety.

FIELD

The present invention relates to the field of communications, and particularly to a method and device for allocating resource.

BACKGROUND

At present, vehicle communication refers to that after a User Equipment (UE) capable of mobile communication is installed on a vehicle, the vehicle can access a vehicle communication network wirelessly through the UE to communicate with another UE. The vehicle can transmit a road safety message to the other UE, where the road safety message can include the state of the vehicle itself, the state of a nearby road, and other information about safety of traveling on the road, so that the other UE can respond to the state upon reception of the road safety message. For example, when a traveling vehicle suddenly fails, then the vehicle may transmit failure state information to a UE installed on a nearby vehicle, or a UE of a passerby so that the nearby vehicle or the passerby can obviate the failing vehicle timely, thus securing the traffic on the road.

In vehicle communication, when a vehicle needs to transmit a road safety message to another UE, then the message needs to be transmitted on a transmission resource. At present, a transmission resource is allocated in two allocation modes, i.e., the allocation mode 3 and the allocation mode 4, where both transmission resources pools in these two allocation modes are allocated by an evolved Node B (eNB), but transmission resources of UEs in the mode 3 are allocated by a nearby eNB, and transmission resources of UEs in the mode 4 are selected by the UEs from the corresponding transmission resource pool, so in order to allocate their resources without affecting each other, transmission resource pool of the UE in the mode 3 is separate from the transmission resource pool of the UE in the mode 4 at present. However such a situation may occur that the transmission resource pool of the UE in the mode 3 has been congested, that is, a high proportion, e.g., 80%, of the transmission resources in the transmission resource pool have been occupied, and the transmission resources in the transmission resource pool of the UE in the mode 4 have been idle. In this situation, the eNB can adjust these two transmission resource pools in some way, but communication may be interrupted due to the adjustment, and thus become instable. Accordingly it is highly desirable at present to address how to improve the utilization ratio of transmission resources reasonably, and one of the solutions is to sharing the transmission resources in the transmission resource pool 1 and the transmission resource pool 2.

If the transmission resource pool of the UEs in the mode 3 and the transmission resource pool of the UEs in the mode 4 are shared, sharing of transmission resource pool does not affect to the UEs in the mode 4 since the UEs in mode 4 may select their transmission resources as they are. But since the transmission resources of the UEs in the mode 3 are allocated by the eNB, and the eNB only knows which transmission resources were allocated by the eNB for the UEs in the mode 3, but does not know which transmission resources are occupied by the UEs in the mode 4, the eNB may allocate a transmission resource occupied by a UE in the mode 4 for a UE in the mode 3 so that the transmission resource used by the UE in the mode 3 may undesirably collide with the transmission resource used by the UE in the mode 4.

SUMMARY

Embodiments of the invention provide a method and device for allocating resource so as to address the technical problem in the prior art that a transmission resource used by a UE in the mode 3 may undesirably collide with a transmission resource used by a UE in the mode 4.

In a first aspect, an embodiment of the invention provides a method for allocating resource, the method including:
determining, by an eNB, whether there are available resources in a shared transmission resource pool by UEs in a first mode and UEs in a second mode, wherein transmission resources of the UEs in the first mode are allocated by the eNB, and transmission resources of the UEs in the second mode are selected by the UEs in the second mode from the shared transmission resource pool; and
when the eNB determines that there are available resources in the shared transmission resource pool, allocating, by the eNB, transmission resources for one or more of the UEs in the first mode based on the available resources.

Optionally determining, by the eNB, whether there are available resources in the shared transmission resource pool by the UEs in the first mode and the UEs in the second mode includes:
receiving, by the eNB, resource state information sent by one or more external devices, wherein the resource state information characterizes states of transmission resources in the shared transmission resource pool by the UEs in the first mode and the UEs in the second mode; and
determining, by the eNB, whether there are available resources in the shared transmission resource pool, according to the resource state information and information about the transmission resources which have been allocated by the eNB.

Optionally before the eNB allocates the transmission resources for the UEs in the first mode based on the available resources, the method further includes:
receiving, by the eNB, assistance information sent by the one or more external devices, wherein the assistance information includes at least geographical position information of the external devices; and
allocating, by the eNB, the transmission resources for one or more of the UEs in the first mode based on the available resources includes:
allocating, by the eNB, the transmission resources for one or more of the UEs in the first mode based on the available resources and the assistance information.

Optionally the external devices at least include the UEs in the first mode, and/or the UEs in the second mode.

Optionally before the eNB receives the resource state information sent by the external devices, the method further includes:

sending, by the eNB, a first instruction message to the UEs in the first mode and/or the UEs in the second mode, to instruct the UEs in the first mode and/or the UEs in the second mode to send the resource state information to the eNB.

Optionally before the eNB sends the first instruction message to the UEs in the first mode and/or the UEs in the second mode, the method further includes:

determining, by the eNB, the UEs in the first mode and/or the UEs in the second mode which need to send the resource state information to the eNB, among UEs in a coverage area of the eNB; and sending, by the eNB, the first instruction message to the UEs in the first mode and/or the UEs in the second mode, to instruct the UEs in the first mode and/or the UEs in the second mode to send the resource state information to the eNB.

Optionally the available resources are transmission resources with measured power values which are not above a preset power threshold; and/or the available resources are transmission resources positions of which are not positions indicated by any one successfully decoded SA.

Optionally the measured power values include at least RSRP values.

Optionally the resource state information is information sent by the UEs in the first mode and/or the UEs in the second mode to the eNB via radio resource control signaling.

Optionally the resource state information is information sent by the UEs in the first mode and/or the UEs in the second mode to the eNB in a bitmap; and/or the resource state information is resource position information sent by the UEs in the first mode and/or the UEs in the second mode to indicate positions of the transmission resources.

Optionally the resource state information includes:

resource state information characterizing the states of the transmission resources at a sub-channel level; and/or resource state information characterizing the states of the transmission resources at a sub-channel set level; and/or resource state information characterizing the states of the transmission resources at a sub-frame level.

Optionally the eNB further allocates a dedicated transmission resource pool for the UEs in the first mode, and after the eNB determines whether there are available resources in the shared transmission resource pool, according to the resource state information and the information about the transmission resources which have been allocated by the eNB, the method further includes:

when the eNB determines that there are no available resources in the shared transmission resource pool, then allocating, by the eNB, transmission resources for one or more UEs in the first mode based on available resources in the dedicated transmission resource pool.

Optionally after the eNB allocates the transmission resources for the one or more UEs in the first mode based on the available resources, the method further includes:

sending, by the eNB, a second indication message, characterizing the transmission resources allocated for the one or more UEs in the first mode, to the UEs in the second mode so that the UEs in the second mode select the transmission resources from the shared transmission resource pool according to the second indication message.

Optionally the method further includes:

determining, by the eNB, whether there are first UEs with colliding transmission resources among all the UEs;

when the eNB determines that there are the first UEs with the colliding transmission resources among all the UEs, then sending, by the eNB, a collision message to all the UEs; or when the eNB determines that there are the first UEs with the colliding transmission resources among all the UEs, then determining, by the eNB, whether the first UEs include the UE in the first mode, and/or the UE in the second mode, and when the eNB determines that the first UEs include the UE in the first mode, then allocating, by the eNB, a transmission resource for at least one UE in the first mode among the first UE based on the other available resources in the shared transmission resource pool, or when the eNB determines that the first UEs include the UE in the second mode, then sending, by the eNB, a third instruction message to the first UEs to instruct at least one UE in the second mode among the first UEs to replace its transmission resource, or when the eNB determines that the first UEs include the UE in the first mode and the UE in the second mode, allocating, by the eNB, a transmission resource for the UE in the first mode among the first UEs based on the other available resources in the shared transmission resource pool, or sending, by the eNB, a third instruction message to the UE in the second mode among the first UEs to instruct the UE in the second mode among the first UEs to replace its transmission resource.

Optionally determining, by the eNB, whether there are first UEs with colliding transmission resources among all the UEs includes:

sending, by the eNB, a fourth instruction message to the UEs in the second mode to instruct the UEs in the second mode to send information about the transmission resources selected by the UEs in the second mode to the eNB; and determining, by the eNB, whether there are first UEs with colliding transmission resources among all the UEs, according to the information about the transmission resources selected by the UEs in the second mode.

Optionally determining, by the eNB, whether there are first UEs with colliding transmission resources among all the UEs includes:

receiving, by the eNB, collision information sent by the UE in the first mode and/or the UE in the second mode, wherein the collision information is information about collision of the transmission resources of the first UEs, determined by the UE in the first mode and/or the UE in the second mode; and determining, by the eNB, whether there are first UEs with colliding transmission resources among all the UEs, according to the collision information.

In a second aspect, an embodiment of the invention provides a computer device including a memory, a processor, and computer program stored in the memory and executable on the processor, wherein the processor is configured to execute the computer program:

to determine at an eNB whether there are available resources in a shared transmission resource pool by UEs in a first mode and UEs in a second mode, wherein transmission resources of the UEs in the first mode are allocated by the eNB, and transmission resources of the UEs in the second mode are selected by the UEs in the second mode from the shared transmission resource pool; and when it is determined that there are available resources in the shared transmission resource pool, to allocate transmission resources for the UEs in the first mode based on the available resources.

Optionally the processor configured to determine at the eNB whether there are available resources in the shared transmission resource pool by the UEs in the first mode and the UEs in the second mode is configured:

to receive at the eNB resource state information sent by one or more external devices, wherein the resource state information characterizes states of transmission resources in the shared transmission resource pool by the UEs in the first mode and the UEs in the second mode; and to determine at the eNB whether there are available resources in the shared transmission resource pool, according to the resource state information and information about the transmission resources which have been allocated by the eNB.

Optionally before the transmission resources are allocated for the UEs in the first mode based on the available resources, the processor is further configured:

to receive assistance information sent by the one or more external devices, wherein the assistance information includes at least geographical position information of the external devices; and the processor configured to allocate the transmission resources for one or more of the UEs in the first mode based on the available resources is configured:

to allocate the transmission resources for one or more of the UEs in the first mode based on the available resources and the assistance information.

Optionally the external devices at least include UEs in the first mode, and/or UEs in the second mode.

Optionally before the resource state information sent by the one or more external devices is received, the processor is further configured:

to send a first instruction message to the UEs in the first mode and/or the UEs in the second mode, to instruct the UEs in the first mode and/or the UEs in the second mode to send the resource state information to the eNB.

Optionally before the first instruction message is sent to the UEs in the first mode and/or the UEs in the second mode, the processor is further configured:

to determine the UEs in the first mode and/or the UEs in the second mode which need to send the resource state information to the eNB, among UEs in a coverage area of the eNB; and to send the first instruction message to the UEs in the first mode and/or the UEs in the second mode, to instruct the UEs in the first mode and/or the UEs in the second mode to send the resource state information.

Optionally the available resources are transmission resources with measured power values which are not above a preset power threshold; and/or the available resources are transmission resources positions of which are not positions indicated by any one successfully decoded SA.

Optionally the measured power values include at least RSRP values.

Optionally the resource state information is information sent by the UEs in the first mode and/or the UEs in the second mode to the eNB via radio resource control signaling.

Optionally the resource state information is information sent by the UEs in the first mode and/or the UEs in the second mode to the eNB in a bitmap; and/or the resource state information is resource position information sent by the UEs in the first mode and/or the UEs in the second mode to indicate the positions of the transmission resources.

Optionally the resource state information includes:

resource state information characterizing the states of the transmission resources at a sub-channel level; and/or resource state information characterizing the states of the transmission resources at a sub-channel set level; and/or resource state information characterizing the states of the transmission resources at a sub-frame level.

Optionally the processor is further configured to allocate a dedicated transmission resource pool for the UEs in the first mode, and after the eNB determines whether there are available resources in the shared transmission resource pool, according to the resource state information and the information about the transmission resources which have been allocated by the eNB, the processor is further configured:

when it is determined that there are no available resources in the shared transmission resource pool, to allocate transmission resources for the one or more UEs in the first mode based on available resources in the dedicated transmission resource pool.

Optionally after the eNB allocates the transmission resources for the UEs in the first mode based on the available resources, the processor is further configured:

to send a second indication message, characterizing the transmission resources allocated for the one or more UEs in the first mode, to the UEs in the second mode so that the UEs in the second mode select the transmission resources from the shared transmission resource pool according to the second indication message.

Optionally the processor is further configured:

to determine whether there are first UEs with colliding transmission resources among all the UEs;

when it is determined that there are the first UEs with the colliding transmission resources among all the UEs, to send a collision message to all the UEs; or when it is determined that there are the first UEs with the colliding transmission resources among all the UEs, to determine whether the first UEs include the UE in the first mode and/or the UE in the second mode, and when it is determined that the first UEs include the UE in the first mode, to allocate a transmission resource for at least one UE in the first mode among the first UE based on the other available resources in the shared transmission resource pool, or when it is determined that the first UEs include the UE in the second mode, to send a third instruction message to the first UEs to instruct at least one UE in the second mode among the first UEs to replace its transmission resource, or when it is determined that the first UEs include the UE in the first mode and the UE in the second mode, to allocate a transmission resource for the UE in the first mode among the first UEs based on the other available resources in the shared transmission resource pool, or to send a third instruction message to the UE in the second mode among the first UEs to instruct the UE in the second mode among the first UEs to replace its transmission resource.

Optionally the processor configured to determine whether there are first UEs with colliding transmission resources among all the UEs is configured:

to send a fourth instruction message to the UEs in the second mode to instruct the UEs in the second mode to send information about the transmission resources selected by the UEs in the second mode to the eNB; and to determine whether there are first UEs with colliding transmission resources among all the UEs, according to the information about the transmission resources selected by the UEs in the second mode.

Optionally the processor configured to determine whether there are first UEs with colliding transmission resources among all the UEs is configured:

to receive collision information sent by the UE in the first mode and the UE in the second mode, wherein the collision information is information about collision of the transmission resources of the first UEs, determined by the UE in the first mode and/or the UE in the second mode; and to determine whether there are first UEs with colliding transmission resources among all the UEs, according to the collision information.

In a third aspect, an embodiment of the invention provides a computer readable storage medium storing computer program configured to perform the method above for allocating resource.

In a fourth aspect, an embodiment of the invention provides a device for allocating resource, the device including:

a determining unit configured to determine whether there are available resources in a shared transmission resource pool by UEs in a first mode and UEs in a second mode, wherein transmission resources of the UEs in the first mode are allocated by the device, and transmission resources of the UEs in the second mode are selected by the UEs in the second mode from the shared transmission resource pool; and an allocating unit configured, when the determining unit determines that there are available resources in the shared transmission resource pool, to allocate transmission resources for one or more of the UEs in the first mode based on the available resources.

Optionally the device further includes a receiving unit, wherein:

the receiving unit configured to receive resource state information sent by one or more external devices, wherein the resource state information characterizes states of transmission resources in the shared transmission resource pool by the UEs in the first mode, and the UEs in the second mode; and the determining unit configured to determine whether there are available resources in the shared transmission resource pool by the UEs in the first mode and the UEs in the second mode is configured:

to determine whether there are available resources in the shared transmission resource pool, according to the resource state information and information about the transmission resources which have been allocated by the allocating unit.

Optionally the receiving unit is further configured to receive assistance information sent by the one or more external devices, wherein the assistance information includes at least geographical position information of the external devices; and the allocating unit configured to allocate the transmission resources for one or more of the UEs in the first mode based on the available resources is configured:

to allocate the transmission resources for one or more of the UEs in the first mode based on the available resources and the assistance information.

Optionally the external devices at least include UEs in the first mode and/or UEs in the second mode.

Optionally the device further includes a sending unit, wherein:

the sending unit is configured, before the receiving unit receives the resource state information sent by the one or more external devices, to send a first instruction message to the UEs in the first mode and/or the UEs in the second mode, to instruct the UEs in the first mode and/or the UEs in the second mode to send the resource state information to the device.

Optionally the determining unit is further configured, before the sending unit sends the first instruction message to the UEs in the first mode and/or the UEs in the second mode, to determine the UE in the first modes and/or the UEs in the second mode which need to send the resource state information to the device, among UEs in a coverage area of the device.

Optionally the available resources are transmission resources with measured power values which are not above a preset power threshold; and/or the available resources are transmission resources positions of which are not positions indicated by any one successfully decoded SA.

Optionally the measured power values include at least RSRP values.

Optionally the resource state information is information sent by the UEs in the first mode and/or the UEs in the second mode to the device via radio resource control signaling.

Optionally the resource state information is information sent by the UEs in the first mode and/or the UEs in the second mode to the device in a bitmap; and/or the resource state information is resource position information sent by the UEs in the first mode and/or the UEs in the second mode to indicate the positions of the transmission resources.

Optionally the resource state information includes:

resource state information characterizing the states of the transmission resources at a sub-channel level; and/or resource state information characterizing the states of the transmission resources at a sub-channel set level; and/or resource state information characterizing the states of the transmission resources at a sub-frame level.

Optionally the allocating unit is further configured to allocate a dedicated transmission resource pool for the UEs in the first mode, wherein:

when the determining unit determines that there are no available resources in the shared transmission resource pool, then the allocating unit is further configured to allocate transmission resources for the UEs in the first mode based on available resources in the dedicated transmission resource pool.

Optionally the sending unit is further configured, after the allocating unit allocates the transmission resources for the one or more UEs in the first mode based on the available resources, to send a second indication message, characterizing the transmission resources allocated for the one or more UEs in the first mode, to the UEs in the second mode so that the UEs in the second mode select the transmission resources from the shared transmission resource pool according to the second indication message.

Optionally the determining unit is further configured to determine whether there are first UEs with colliding transmission resources among all the UEs;

the sending unit is further configured to send a collision message to all the UEs when the determining unit determines that there are the first UEs with the colliding transmission resources among all the UEs;

the determining unit is further configured, upon determining that there are the first UEs with the colliding transmission resources among all the UEs, to determine whether the first UEs include the UE in the first mode and/or the UE in the second mode;

the allocating unit is further configured, when the determining unit determines that the first UEs include the UE in the first mode, to allocate a transmission resource for at least one UE in the first mode among the first UE based on the other available resources in the shared transmission resource pool, or when the determining unit determines that the first UEs include the UE in the first mode and the UE in the second mode, to allocate a transmission resource for the UE in the first mode among the first UEs based on the other available resources in the shared transmission resource pool; and the sending unit is further configured, when the determining unit determines that the first UEs include the UE in the second mode, to send a third instruction message to the first UEs to instruct at least one UE in the second mode among the first UEs to replace its transmission resource, or when the determining unit determines that the first UEs include the UE in the first mode and the UE in the second mode, to send a third instruction message to the UE in the second mode among the first UEs to instruct the UE in the second mode among the first UEs to replace its transmission resource.

Optionally the sending unit is further configured to send a fourth instruction message to the UEs in the second mode to instruct the UEs in the second mode to send information about the transmission resources selected by the UEs in the second mode to the device; and the determining unit configured to determine whether there are first UEs with colliding transmission resources among all the UEs is configured:

to determine whether there are first UEs with colliding transmission resources among all the UEs, according to the information about the transmission resources selected by the UEs in the second mode.

Optionally the receiving unit is further configured to receive collision information sent by the UE in the first mode and the UE in the second mode, wherein the collision information is information about collision of the transmission resources of the first UEs, determined by the UE in the first mode and/or the UE in the second mode; and the determining unit configured to determine whether there are first UEs with colliding transmission resources among all the UEs is configured:

to determine whether there are first UEs with colliding transmission resources among all the UEs, according to the collision information.

Optionally the device for allocating resource is the eNB.

In the embodiments of the invention, before the eNB allocates the transmission resources for the UEs in the first mode, the eNB can firstly determine available resources in the shared transmission resource pool, and then allocate transmission resources for the UEs in the first mode based on these available resources, so that the transmission resources occupied by the UEs in the second mode can be avoided from being allocated for the UEs in the first mode to thereby avoid the transmission resources of the UEs in the first mode from colliding with the transmission resources of the UEs in the second mode.

BRIEF DESCRIPTION OF THE DRAWINGS

FIG. 1 is a schematic diagram of an application scenario of the embodiments of the invention;

FIG. 2 is a flow chart of a method for allocating resource according to an embodiment of the invention; and FIG. 3 is a schematic structural diagram of a device for allocating resource according to an embodiment of the invention.

DETAILED DESCRIPTION

In order to make the objects, technical solutions, and advantages of the embodiments of the invention more apparent, the technical solutions according to the embodiments of the invention will be described below clearly and fully with reference to the drawings in the embodiments of the invention.

A part of terms in the embodiments of the invention will be described below for understanding by those skilled in the art.

The UE refers to a device which can provide a user with data connectivity, where the device can communicate with another UE over a Radio Access Network (RAN), and for example, can be embodied as a vehicular mobile device, etc. Of course, the UE can also be a device capable of wireless communication, although the embodiment of the invention will not be limited thereto.

Moreover the term "and/or" in this context only refers to an association relationship between associated objects, and represents three possible relationships, for example, "A and/or B" may represent three instances of A alone, B alone, and both A and B. Moreover the symbol "/" in this context generally represents an "or" relationship between preceding and succeeding associated objects.

Firstly an application scenario of the embodiments of the invention will be introduced, and as illustrated in FIG. 1, a mode-3 UE refers to a UE in the mode 3, and a mode-4 UE refers to a UE in the mode 4; a transmission resource pool is a transmission resource pool allocated by an eNB for the mode-3 UE, and a transmission resource pool 2 is a transmission resource pool allocated by an eNB for the mode-4 UE. The mode-3 UE can send a road safety message to another mode-3 UE or the mode-4 UE, and the mode-4 UE can also send a road safety message to another mode-4 UE or the mode-3 UE. When the mode-3 UE needs to send a road safety message, the mode-3 UE sends a transmission resource request to the eNB to notify the eNB that the mode-3 UE needs to send a road safety message and a transmission resource which the mode-3 UE needs to send the road safe message, so the eNB allocates an idle transmission resource in the transmission resource pool 1 for the mode-3 UE in response to the transmission resource request. When the mode-4 UE needs to send a road safety message, the mode-4 UE can know which transmission resources in the transmission resource pool 2 have been occupied, according to road safety messages sent by the other UEs and received by the mode-4 UE, so the mode-4 UE selects one of idle transmission resources remaining in the transmission resource pool 2.

The transmission resource pool 1 and the transmission resource pool 2 are independent from each other at present, and the inventors have identified during making of the invention that such a situation may also occur that the transmission resource pool 1 has been congested, and all the transmission resources in the transmission resource pool 2 are idle, so it is highly desirable at present to address how to improve the reasonable utilization ratio of transmission resources, and one of the solutions is to sharing the transmission resources in the transmission resource pool 1 and the transmission resource pool 2.

If the transmission resources in the transmission resource pool 1 and the transmission resource pool 2 are shared, since the UEs in the mode 4 selects their transmission resources as they are, there is no effect to the mode-4 UEs, but since the transmission resources of the UEs in the mode 3 are allocated by the eNB, and the eNB only knows which transmission resources were allocated by the eNB for the UEs in the mode 3, but does not know which transmission resources are occupied by the UEs in the mode 4, the eNB may allocate a transmission resource occupied by a UE in the mode 4 for a UE in the mode 3 so that the transmission resource used by the UE in the mode 3 may undesirably collide with the transmission resource used by the UE in the mode 4.

In view of this, the embodiments of the invention provide a solution to allocating a resource, and in this solution, before an eNB allocates a transmission resource for a mode-3 UE, the eNB firstly determines available resources in a shared transmission resource pool, and then allocates a transmission resource for the mode-3 UE among these available resources, so that a transmission resource occupied by a mode-4 UE can be avoided from being allocated to the mode-3 UE, thus avoiding the transmission resource of the mode-3 UE from colliding with the transmission resource of the mode-4 UE.

The technical solution according to the embodiments of the invention will be described below with reference to the drawings. In the following description, the technical solution according to the embodiments of the invention can be applied to the application scenario as illustrated in FIG. 1, for example, but the embodiments of the invention will not be limited to the application scenario.

As illustrated in FIG. 2, a method for allocating a resource according to an embodiment of the invention includes the following steps.

In the step 201, an eNB determines whether there are available resources in a shared transmission resource pool shared by UEs in a first mode and UEs in a second mode, where the transmission resource of the UEs in the first mode are allocated by the eNB, and transmission resource of the UEs in the second mode are selected by the UEs in the second mode from the shared transmission resource pool.

In the step 202, when the eNB determines that there are available resources in the shared transmission resource pool, then the eNB allocates a transmission resource for one or more UEs in the first mode according to the available resources.

In the embodiment of the invention, the UE(s) in the first mode can be mode-3 UE(s), and the UE(s) in the second mode can be mode-4 UE(s).

In the embodiment of the invention, before the eNB determines whether there are available resources in the shared transmission resource pool shared by the UEs in the first mode, and the UEs in the second mode, the eNB can further receive resource state information sent by one or more external devices. Specifically the external devices can be one or more UEs in the first mode, and/or one or more UEs in the second mode, or of course, the external devices can include another possible devices, although the embodiment of the invention will not be limited thereto.

In the embodiment of the invention, before the eNB receives resource state information sent by one or more UEs in the first mode and one or more UEs in the second mode, the eNB can determine the UEs in the first mode and/or the UEs in the second mode which need to send resource state information to the eNB, among UEs in a coverage area of the eNB.

Specifically the UEs in the first mode, and/or the UEs in the second mode which need to send resource state information to the eNB can be preset by the eNB, that is, it can be set in the eNB that one or both of the UEs in the first mode and the UEs in the second mode are required to send resource state information to the eNB. For example, the eNB can preset that only the UEs in the first mode in the coverage area of the eNB are required to send resource state information, or the eNB can preset that only the UEs in the second mode in the coverage area of the eNB are required to send resource state information, or the eNB can preset that both the UEs in the first mode, and the UEs in the second mode in the coverage area of the eNB are required to send resource state information.

The UEs in the first mode, and/or the UEs in the second mode will be simply referred hereinafter to UEs. A UE as referred hereinafter to will include a UE in the first mode, and/or a UE in the second mode, and this will not be explained below.

In a real application, a UE transmits resource state information to the eNB on the same channel as a channel on which other UEs communicates, so if a large amount of resource state information is sent to the eNB at the same time, then communication of the other UE may be affected. In view of this, the eNB can require a part of the UEs to send resource state information. Specifically the eNB can estimate the proportion of the UEs to send resource state information to the eNB among the UEs in the coverage area, where the proportion here can be estimated so that communication of the other UEs is not affected. After the eNB determines the proportion of the UEs in the first mode, and the UEs in the second mode to send resource state information to the eNB, the eNB can select a corresponding number of UEs to this proportion in the coverage area. Moreover the eNB can further select the UEs taking into account a geographical position factor, that is, the eNB selects the UEs including UEs at respective positions so that the eNB can receive comprehensive resource state information.

In the embodiment of the invention, after the eNB determines the UEs to send resource state information to the eNB, that is, the eNB determines the UEs in the first mode, and/or the UEs in the second mode to send resource state information to the eNB, the eNB can send a first instruction message to these UEs to instruct these UEs to send the resource state information to the eNB.

In the embodiment of the invention, the UEs send their collected resource state information to the eNB upon reception of the first instruction message.

In a real application, the UEs can send road safety messages to the other UEs, but also receive road safety messages sent by the other UEs, where each road safety message includes data of the road safety message, but also position information, i.e., Scheduling Assignment (SA), indicating the transmission resource occupied by the UE sending the road safety message. The UE can decode the SA upon reception of the road safety message, and if the SA is decoded successfully, then the transmission resource at the position indicated by the SA has been occupied, that is, the transmission resource at the position indicated by the SA is an unavailable resource; or if the position of the transmission resource is not the position indicated by the successfully decoded SA, then the transmission resource haven't been occupied, that is, the transmission resource is an available resource.

Furthermore after the UE decodes the SA successfully, the UE can further measure a power value of the SA, and determine whether the transmission resource at the position indicated by the SA is an available resource according to the measured power value of the SA. Such a situation may occur that the position of the transmission resource may be indicated by the successfully decoded SA, but the measured power value of the SA is small, so the signal strength of the road safety message including the SA is low, and it can be determined that the position indicated by the SA is not occupied, that is, when the measured power value of the SA is not above a preset power threshold, it is determined that the transmission resource at the position indicated by the SA is an available resource.

Furthermore the UE can further measure a transmission resource in the shared transmission resource pool upon reception of the first instruction message, so the UE can determine the state of the transmission resource according to the measured power value of the transmission resource. Specifically when the power value of the transmission resource measured by the UE is above the preset power threshold, then it indicates that there is a UE sending a road safety message on the transmission resource, that is, the transmission resource is being occupied; or when the power value of the transmission resource measured by the UE is not above the preset power threshold, then it indicates there may be a UE sending a road safety message on the transmission resource, but the power value is small, so even if there is a UE sending a road safety message, then the signal strength of the road safety message is low, so it can be determined that the transmission resource is not occupied by the UE, that is, when the power value of the transmission resource measured by the UE is not above the preset power threshold, it is determined that the transmission resource is an available resource.

Furthermore the power value of the transmission resource measured by the UE can be Reference Signal Received Power (RSRP), and when the RSRP value measured by the UE is not above a preset RSRP threshold, it is determined that the transmission resource corresponding to the RSRP value is an available resource; otherwise, it is determined that the transmission resource corresponding to the RSRP value is an unavailable resource, where the preset RSRP threshold can be preset by the UE, or can be set differently according to different transmission resources. Of course, the RSRP threshold can alternatively be set by the UE according to a preset RSRP threshold sent by the eNB.

In the embodiment of the invention, the UE can further send the measured power value to the eNB after measuring the power value, so the eNB can also determine whether the transmission resource is an available resource, according to whether the measured power value is not above a preset power threshold. The preset power threshold can be preset by the eNB, and the preset power threshold may or may not be the same as the preset power threshold set by the UE.

In the embodiment of the invention, the UE can determine whether the transmission resource is an available resource in one or more of the three implementations above. Specifically in the three implementations, the UE determines whether the position of the transmission resource is a position indicated by any one successfully decoded SA, whether the measured power value of the SA is not above the preset power threshold, and whether the measured power value of the transmission resource is not above the preset power value.

In the embodiment of the invention, after the UE determines whether the transmission resource is an available resource, it can generate resource state information according to a determination result. The resource state information can be resource state information of a past resource, or can be resource state information of a future resource. The resource state information of the past resource refers to state information of a transmission resource before the instance of time when the UE sends the resource state information, and the resource state information of the future resource refers to state information of a transmission resource after the instance of time when the UE sends the resource state information. The resource state information of the future resource can be calculated according to a duration and/or a periodicity of a previous transmission resource obtained by the UE, and of course, the resource state information sent by the UE can include a duration and/or a periodicity of the transmission resource. Moreover the resource state information can further include priority information, e.g., priority information of the data in the road safety message, or priority information of the UE.

When the eNB requires the UE to send resource state information, the UE can send the generated resource state information to the eNB. Specifically the resource state information sent by the UE can include state information of an available resource known to the UE, and/or state information of the other unavailable resources determined by the UE according to the state information of the occupied transmission resource. Of course, the resource state information sent by the UE can also include the state information of the transmission resource occupied by the UE, and the UE can further indicate the position of the transmission resource occupied by the UE so that the eNB can know the position of the transmission resource occupied by the UE upon reception of the resource state information. Or the resource state information sent by the UE can include only the state information of the transmission resource occupied by the UE.

In a real application, the resource state information sent by the UE can be all of the resource state information known to the UE, or can be a part of the resource state information known to the UE. When the UE sends a part of the known resource state information to the eNB, then this part of the resource state information sent to the eNB may be selected randomly from all the resource state information, or may be selected by the UE from all the resource state information under a predetermined rule. For example, when the resource state information sent by the UE to the eNB is the state information of available resources determined by the UE, then idle degrees of these available resources may be sorted under the predetermined rule, transmission resources with higher idle degrees may be selected from the available resources, and the resource state information of these transmission resources with the higher idle degrees may be sent to the eNB. Specifically the idle degrees of the transmission resources can be determined according to measured Received Signal Strength Indexes (RSSIs) of the transmission resources, where a transmission resource corresponding to a lower RSSI is more idle.

In the embodiment of the invention, there are respective levels of a transmission resources, and for example, the transmission resource can be at a sub-frame level, and since a sub-frame can further include a plurality of sub-channels, the transmission resource can also be at a sub-channel level; and since a plurality of sub-channels can be combined differently into a plurality of sub-channel sets, the transmission resource can also be at a sub-channel set level, so the resource state information sent by the UE to the eNB can be resource state information of the transmission resource at the respective levels. Specifically the resource state information can include but will not be limited to the following three kinds of resource state information: resource state information characterizing the state of the transmission resource at a sub-channel level; and/or resource state information characterizing the state of the transmission resource at a sub-channel set level; and/or resource state information characterizing the state of the transmission resource at a sub-frame level.

Specifically the resource state information at the sub-channel level can characterize the state of a specific sub-channel; the resource state information at sub-channel set level can characterize the state of a sub-channel set, that is, if the state of the sub-channels set is indicated as an available resource, then the states of all the sub-channels in the sub-channel set are available resources; and the resource state information at the sub-frame level can characterize the state of a sub-frame, that is, if the state of the sub-frame is indicated as an available resource, then the states of all the sub-channels in the sub-frame are available resources.

Specifically there are also two special cases: when all the sub-channels in the resource state information at the sub-channel set level are occupied, the resource state information at the sub-channel set level is equivalent to resource state information at the sub-frame level; and when only one of the sub-channels in the resource state information at the sub-channel set level is occupied, the resource state information at the sub-channel set level is equivalent to resource state information at the sub-channel level.

Specifically the UE can further send the resource state information to the eNB by including information indicating the level of the resource state information in the resource state information so that the eNB can know the level of the resource state information sent by the UE.

In the embodiment of the invention, the UE can send the resource state information to the UE via Radio Resource Control (RRC) signaling.

In the embodiment of the invention, the UE can alternatively send the resource state information to the eNB in a number of implementations which specifically include at least but will not be limited to the following two implementations:

The UE can send the resource state information to the eNB in a bitmap; or

The resource state information sent by the UE can be resource position information indicating the position of the transmission resource in the time-frequency domain.

Specifically the UE can further send the resource state information to the eNB by including information about a transmission mode of the UE in the resource state information, so that the eNB can know the transmission mode of the UE and further perform a subsequent process.

In the embodiment of the invention, in order to limit the amount of resource state information sent by the UE so as not to affect communication of the other UEs, the number of sub-channels occupied by the resource state information sent by the UE can be limited, that is, the number of bits of the resource state information sent by the UE. Calculation of the resource state information will be described below in details by way of an example in which transmission resources in the shared transmission resource pool include 1,000 sub-frames in total, each of which includes ten sub-channels.

Specifically if the UE sends resource state information to the UE in a bitmap, then a bit of 0 may indicate that a transmission resource at that position is an available resource, and a bit of 1 may indicate that a transmission resource at that position is an unavailable resource; or of course, a bit of 1 may indicate that a transmission resource at that position is an available resource, and a bit of 0 may indicate that a transmission resource at that position is an unavailable resource, although the embodiment of the invention will not be limited thereto. The following description will be given by way of an example in which a bit of 0 indicates that a transmission resource at that position is an available resource, and a bit of 1 indicates that a transmission resource at that position is an unavailable resource.

When the resource state information characterizes the occupancy state of a transmission resource at a sub-frame level, and one bit can represent the state of one sub-frame, then there needs 1,000 bits for 1,000 sub-frames. Specifically when a bit of some sub-frame is 1, then it indicates that a part or all of sub-channels in the sub-frame are unavailable resources; and when a bit of some sub-frame is 0, then it indicates that all of sub-channels in the sub-frame are available resources.

When the resource state information characterizes the occupancy state of a transmission resource at a sub-channel set level, and one bit can represent the state of a sub-channel set, then since ten sub-channels in a sub-frame can be combined into seven sub-channel sets, there needs 7,000 bits for sub-channel sets in 1,000 sub-frames. Specifically when a bit of some sub-channel set is 1, then it indicates that a part or all of sub-channels in the sub-channel set are unavailable resources; and when a bit of some sub-channel set is 0, then it indicates that all of sub-channels in the sub-channel set are available resources.

When the resource state information characterizes the occupancy state of a transmission resource at a sub-channel level, and one bit can represent the state of a sub-channel, then there needs 10,000 bits for 10,000 sub-channels in 1,000 sub-frames. Specifically when a bit of some sub-channel is 1, then it indicates that the sub-channel is an unavailable resource; and when a bit of some sub-channel is 0, then it indicates that the sub-channel is an available resource.

Specifically when the resource state information sent by the UE is resource position information indicating the position of a transmission resource in the time-frequency domain, then the transmission resource corresponding to the resource position information sent by the UE may be an available resource or an unavailable resource specifically as needed in reality. In order to position the transmission resource, a reference position shall be set, so the resource position information here refers to a relative position of the transmission resource to the reference position. For example, a sub-frame corresponding to the instance of time when the position information is sent is set as the reference position, so the resource state information sent by the UE indicates the distance between the transmission resource and the reference position. The UE can know the real position of the transmission resource through some conversion upon reception of the resource position information, where the reference position can be preset, and the same reference position shall be defaulted by the eNB and the UE; otherwise the position of the transmission resource obtained by the UE as a result of conversion may not be accurate. Or the UE can send the reference position together with the resource state information to the eNB; or the reference position can be sent by the eNB to the UE.

When the resource state information sent by the UE is resource position information indicating the position of the transmission resource in the time-frequency domain, then the resource position information sent by the UE will be calculated as follows.

When the resource position information sent by the UE is at a sub-frame level, then there needs ten bits representing possible arrangements of 1,000 sub-frames. Since states represented by the 10 bits are combined into $2^{10}$ arrangements, each of which represents the position of a sub-frame, position information of all the 1,000 sub-frames can be represented, so the position of a sub-frame can be represented in ten bits.

When the resource state information sent by the UE is at a sub-channel set level, then firstly there needs ten bits representing the position of a sub-channel set in a sub-frame; and secondly there are ten sub-channels in a sub-frame, and there are seven possible sub-channel sets, so there needs three bits representing possible arrangements of the seven sub-channel sets. Since states represented by three bits can be combined into $2^3$ arrangements, each of which represents the position of a sub-channel set, position information of all the seven sub-channel sets in a sub-frame can be represented, so the position of a sub-channel set can be represented in 13 bits.

When the UE needs to send 20 pieces of resource position information to the eNB, then when the UE sends the resource position information at a sub-frame level, then there needs 20*10=200 bits; and when the user sends the resource position information at a sub-channel set level, then there needs 20*10=260 bits.

In the embodiment of the invention, the transmission resources can be further categorized according to their different periodicities or durations, where when they are categorized according to their periodicities which may be a part or all of allowable periodicities, then the resource state information sent by the UE may further include category information of the transmission resources, and the numbers of respective categories of transmission resources. For example, when the transmission resources are categorized according to their periodicities, then the number of pieces of resource state information of transmission resources at each periodicity may also be sent to the eNB. Specifically the periodicities of the transmission resources may be 20 ms, 50 ms, and 100 ms, for example, or of course, the periodicities of the transmission resources may be other possible periodicities, although the embodiment of the invention will not be limited thereto. Here the UE sending a message on a transmission resource with the periodicity of 100 ms can alternatively send the message on a transmission resource with the periodicity of 20 ms or 50 ms, so the number of pieces of resource state information of a transmission resource with the periodicity of 100 ms sent by the UE to the eNB can also include the number of pieces of resource state information of a transmission resource with the periodicity of 20 ms or 50 ms. Of course, in order to avoid duplicated resource state information, when the resource state information sent by the UE includes the number of pieces of resource state information of a transmission resource with the periodicity of 20 ms or 50 ms, this number can be precluded from the number of pieces of resource state information of a transmission resource with the periodicity of 100 ms.

In the embodiment of the invention, the eNB can receive the resource state information after the UE sends the resource state information to the eNB. Upon reception of the resource state information of the UE, the eNB can determine whether there is a further available resource in the shared transmission resource pool according to the resource state information, and the information about the transmission resources which have been allocated by the eNB for the UEs in the first mode. Specifically when the resource state information sent by the UE indicates that a part of the transmission resources in the shared transmission resource pool are unavailable resources, then the eNB may determine that the other transmission resources than the transmission resource to which the resource state information relates are available resources, according to the resource state information, and may further preclude the transmission resources which have been allocated by the eNB for the UEs in the first mode from these available resources, and when there is still a remaining transmission resource, then the remaining transmission resource will be a really idle available resource, that is, the eNB may determine that there is still an available resource in the shared transmission resource pool.

In the embodiment of the invention, upon determining that there are still available resources in the shared transmission resource pool, the eNB can allocate transmission resources for one or more UEs in the first mode among these available resources.

In the embodiment of the invention, before the eNB determines whether there is an available resource in the shared transmission resource pool shared by the UEs in the first mode, and the UEs in the second mode, the eNB can further receive assistance information sent by the external device, where the assistance information includes at least geographical position information of the external device. Here the external device can send the assistance information together with the resource state information to the eNB, or can send the assistance information to the eNB before and after the resource state information is sent, although the embodiment of the invention will not be limited thereto, so the eNB can further allocate more appropriate transmission resources for the UEs in the first mode taking into account geographical position information of the UEs in the first mode.

In the embodiment of the invention, the eNB can further receive collision information sent by the UEs in the first mode after allocating the transmission resources for the UEs. Specifically the collision information can be sent by one or more of first UEs colliding with each other, or can be sent by another device to the eNB. The other device refers to a UE knowing that there are first UEs which occupy colliding transmission resources. Here the collision information can include information indicating the colliding transmission resources, and/or information indicating the colliding first UEs. The collision information can also include assistance information, where for example, the assistance information is geographical position information of the other UE sending the collision information, and/or geographical position of the colliding first UEs. The collision information can further include priority information, e.g., priority information of the data of the road safety message, or priority information of the UEs.

Moreover when a colliding UE determines that its transmission resource collides with another transmission resource and the UE is a UE in the second mode, then the UE may further reselect another available resource in the shared transmission resource pool. When the other device determines that the transmission resources collide with each other, then the other device may further include information indicating the colliding transmission resources, and/or information indicating the colliding UEs, in road safety data and/or SA in a safety security message sent by the other device.

The eNB can determine whether there are such first UEs which occupy colliding transmission resources, according to the received collision information.

When the eNB determines that there are such first UEs that occupy colliding transmission resources, among all the UEs, but the eNB can not determine which UEs occupy colliding transmission resources, then the eNB may send a collision message to all the UEs so that all the UEs know which transmission resources collide with each other, so they can determine whether their transmission resources are colliding with the other transmission resources, and if so, they may handle the collision. Here when a UE in the first mode determines that its transmission resource collides with another transmission resource, then the UE in the first mode may request the eNB for reallocating a transmission resource for the UE; and when a UE in the second mode determines that its transmission resource collides with another transmission resource, then the UE in the second mode may reselect a transmission resource.

In the embodiment of the invention, the eNB can alternatively determine which transmission resources collide with each other, and/or which UEs occupy colliding transmission resources, according to the received collision information, and the eNB can further determine those transmission resources and/or those UEs according to the resource state information sent by the UEs. After the eNB determines that there are such first UEs that occupy colliding transmission resources, when the eNB determines that the colliding first UEs include UEs in the first mode, then the eNB may reallocate a transmission resource for at least one UE in the first mode among the first UEs based on the other available resources in the shared transmission resource pool. Of course, the first UEs determined by the eNB may include only the UEs in the first mode, or the first UEs determined by the eNB may include the UEs in the first mode, but the eNB can not determine another or other UEs occupying a transmission resource or resources colliding with the transmission resources of the UEs in the first mode, so the other UE or UEs here may be a UE or UEs in the first mode, or a UE or UEs in the second mode. For example, when the other UE or UEs is or are a UE or UEs in the first mode, that is, all the UEs occupying the colliding transmission resources are UEs in the first mode, then the eNB may reallocate a transmission resource or resources for one or more of the UEs in the first mode.

After the eNB determines that there are such first UEs that occupy colliding transmission resources, when the eNB determines that the colliding first UEs include a UE or UEs in the second mode, then the eNB may send a third instruction message to the UE or UEs in the second mode, to instruct the at least one UE in the second mode among the first UEs to replace its transmission resource. Of course, the first UEs determined by the eNB may include only the UEs in the second mode, or the first UEs determined by the eNB may include the UEs in the second mode, but the eNB can not determine another or other UEs occupying a transmission resource or resources colliding with the transmission resources of the UEs in the second mode, so the other UE or UEs here may be a UE or UEs in the first mode, or a UE or UEs in the second mode. For example, when the other UE or UEs is or are a UE or UEs in the second mode, that is, all the UEs occupying the colliding transmission resources are UEs in the second mode, then the eNB may send the third instruction message to one or more of the UEs in the second mode.

After the eNB determines that there are such first UEs that occupy colliding transmission resources, when the eNB determines that the colliding first UEs include UEs in the first mode and a UE or UEs in the second mode, then the eNB may reallocate transmission resources for the UEs in the first mode among the first UEs based on the other available resources in the shared transmission resource pool, or the eNB may send a third instruction message to the UEs in the second mode among the first UEs to instruct the UEs in the second mode to replace their transmission resources.

The eNB can further send a second indication message, characterizing the transmission resources which have been allocated for the UEs in the first mode, to the UEs in the second mode, so that the UEs in the second mode can select transmission resources from the shared transmission resource pool other than these transmission resources allocated for the UEs in the first mode so that the transmission resources occupied by the UEs in the second mode can be avoided from colliding with the transmission resources occupied by the UEs in the first mode.

Since the resource state information sent by the UEs may be incomplete, that is, the resource state information may not include the states of all the transmission resources in the shared transmission resource pool, an available resource determined by the eNB based upon the resource state information may collide with a transmission resource occupied by a UE in the second mode, so after the eNB allocates a transmission resource for a UE in the first mode, the eNB can send a fourth instruction message to the UE in the second mode to instruct the UE in the second mode to send information about the transmission resource selected by the UE in the second mode to the eNB. The UE or UEs in the second mode here may be a part or all of the UEs in the second mode.

Upon reception of the information about the transmission resource selected by the UE in the second mode, the eNB can determine whether the transmission resource selected by the UE in the second mode collides with the transmission resource allocated by the eNB for the UE in the first mode, according to the transmission resource selected by the UE in the second mode, and the transmission resource allocated by the eNB for the UE in the first mode.

When the eNB determines that the transmission resource selected by the UE in the second mode collides with the transmission resource allocated by the eNB for the UE in the first mode, then the eNB may newly determine another available resource in the shared transmission resource pool, and reallocate the transmission resource for the UE in the first mode; or the eNB may send a third instruction message to the UE in the second mode with the transmission resource colliding with the transmission resource allocated by the eNB for the UE in the first mode, to instruct the UE in the second mode to replace its transmission resource with another transmission resource.

In the embodiment of the invention, in order to guarantee the transmission performance of the UEs in the first mode, the eNB can further allocate a smaller dedicated transmission resource pool for the UEs in the first mode. The eNB can allocate transmission resources for the UEs in the first mode based on the dedicated transmission resource pool upon determining that there is no available resource in the shared transmission resource pool.

In summary, before the eNB allocates the transmission resources for the UEs in the first mode, the eNB can firstly determine available resources in the shared transmission resource pool, and then allocate transmission resources for the UEs in the first mode based on these available resources so that the transmission resources occupied by the UEs in the second mode can be avoided from being allocated for the UEs in the first mode, to thereby avoid the transmission resources of the UEs in the first mode from colliding with the transmission resources of the UEs in the second mode.

A device according to an embodiment of the invention will be described below with reference to the drawings.

As illustrated in FIG. 3, based upon the same inventive idea, an embodiment of the invention provides a device 30 for allocating a resource, where the device includes the following units.

A determining unit 301 is configured to determine whether there are available resources in a shared transmission resource pool shared by UEs in a first mode and UEs in a second mode, where transmission resources of the UEs in the first mode are allocated by the device 30 for allocating a resource, and transmission resources of the UEs in the second mode are selected by the UEs in the second mode from the shared transmission resource pool.

An allocating unit 302 is configured, when the determining unit 301 determines that there are available resources in the shared transmission resource pool, to allocate transmission resources for one or more UEs in the first mode based on the available resources.

Optionally the device further includes a receiving unit 304.

The receiving unit 304 is configured to receive resource state information sent by one or more external devices, where the resource state information characterizes the states of transmission resources in the shared transmission resource pool by the UEs in the first mode and the UEs in the second mode.

The determining unit 301 configured to determine whether there are available resources in the shared transmission resource pool by the UEs in the first mode and the UEs in the second mode is configured: to determine whether there are available resources in the shared transmission resource pool, according to the resource state information and information about the transmission resources which have been allocated by the allocating unit.

Optionally the receiving unit 304 is further configured to receive assistance information sent by the one or more external devices, where the assistance information includes at least geographical position information of the external devices.

The allocating unit 302 configured to allocate the transmission resources for the one or more UEs in the first mode based on the available resources is configured: to allocate the transmission resources for the one or more UEs in the first mode based on the available resources based and the assistance information.

Optionally the external devices at least include UEs in the first mode and/or UEs in the second mode.

Optionally the device further includes a sending unit 303.

The sending unit 303 is configured, before the receiving unit 304 receives the resource state information sent by the one or more external devices, to send a first instruction message to the UEs in the first mode and/or the UEs in the second mode, to instruct the UEs in the first mode and/or the UEs in the second mode to send the resource state information to the device 30.

Optionally the determining unit 301 is further configured, before the sending unit 303 sends the first instruction message to the UEs in the first mode and/or the UEs in the second mode, to determine the UEs in the first mode and/or the UEs in the second mode which need to send the resource state information to the device 30, among UEs in a coverage area of the device 30.

Optionally the available resources are transmission resources with measured power values which are not above a preset power threshold; and/or the available resources are transmission the positions of which are not positions indicated by any one successfully decoded SA.

Optionally the measured power values include at least RSRP values.

Optionally the resource state information is information sent by the UEs in the first mode, and/or the UEs in the second mode to the device 30 via radio resource control signaling.

Optionally the resource state information is information sent by the UEs in the first mode, and/or the UEs in the second mode to the device 30 in a bitmap; and/or the resource state information is resource position information sent by the UEs in the first mode and/or the UEs in the second mode to indicate the positions of the transmission resources.

Optionally the resource state information includes: resource state information characterizing the states of the transmission resources at a sub-channel level; and/or resource state information characterizing the states of the transmission resources at a sub-channel set level; and/or resource state information characterizing the states of the transmission resources at a sub-frame level.

Optionally the allocating unit 302 is further configured to allocate a dedicated transmission resource pool for the UEs in the first mode, where: when the determining unit 301 determines that there are no available resources in the shared transmission resource pool, then the allocating unit 302 is further configured to allocate transmission resources for the UEs in the first mode based on available resources in the dedicated transmission resource pool.

Optionally the sending unit 303 is further configured, after the allocating unit 302 allocates the transmission resources for the one or more UEs in the first mode based on the available resources, to send a second indication message, characterizing the transmission resources allocated for the one or more UEs in the first mode, to the UEs in the second mode so that the UEs in the second mode select the transmission resources from the shared transmission resource pool according to the second indication message.

Optionally the determining unit 301 is further configured to determine whether there are first UEs with colliding transmission resources among all the UEs.

The sending unit 303 is further configured to send a collision message to all the UEs when the determining unit 301 determines that there are the first UEs with the colliding transmission resources among all the UEs.

The determining unit 301 is further configured, upon determining that there are the first UEs with the colliding transmission resources among all the UEs, to determine whether the first UEs include the UE in the first mode and/or the UE in the second mode.

The allocating unit 302 is further configured, when the determining unit 301 determines that the first UEs include the UE in the first mode, to allocate a transmission resource for at least one UE in the first mode among the first UE based on the other available resources in the shared transmission resource pool, or when the determining unit 301 determines that the first UEs include the UE in the first mode and the UE in the second mode, to allocate a transmission resource for the UE in the first mode among the first UEs based on the other available resources in the shared transmission resource pool.

The sending unit 303 is further configured, when the determining unit 301 determines that the first UEs include the UE in the second mode, to send a third instruction message to the first UEs to instruct at least one UE in the second mode among the first UEs to replace its transmission resource, or when the determining unit 301 determines that the first UEs include the UE in the first mode and the UE in the second mode, to send a third instruction message to the UE in the second mode among the first UEs to instruct the UE in the second mode among the first UEs to replace its transmission resource.

Optionally the sending unit 303 is further configured to send a fourth instruction message to the UEs in the second mode, to instruct the UEs in the second mode to send information about the transmission resources selected by the UEs in the second mode to the device 30.

The determining unit 301 configured to determine whether there are first UEs with colliding transmission resources among all the UEs is configured: to determine whether there are first UEs with colliding transmission resources among all the UEs, according to the information about the transmission resources selected by the UEs in the second mode.

Optionally the receiving unit 304 is further configured to receive collision information sent by the UE in the first mode and the UE in the second mode, where the collision information is information about collision of the transmission resources of the first UEs, determined by the UE in the first mode and/or the UE in the second mode.

The determining unit 301 configured to determine whether there are first UEs with colliding transmission resources among all the UEs is configured: to determine whether there are first UEs with colliding transmission resources among all the UEs, according to the collision information.

Optionally the device 30 for allocating resource is the eNB.

Since the device for allocating resource according to the embodiment of the invention is configured to perform the method according to the embodiment of the invention as illustrated in FIG. 2, reference can be made to the description of the embodiment as illustrated in FIG. 2 for details of the functions to be performed by the respective function modules in the device for allocating resource, and some implementations thereof, and a repeated description thereof will be omitted here.

Based upon the same inventive idea, an embodiment of the invention provides a computer device including a memory, a processor, and computer program stored in the memory and executable on the processor, where the processor is configured to execute the computer program: to determine at an eNB whether there are available resources in a shared transmission resource pool shared by UEs in a first mode and UEs in a second mode, where transmission resources of the UEs in the first mode are allocated by the eNB, and transmission resources of the UEs in the second mode are selected by the UEs in the second mode from the shared transmission resource pool; and when it is determined that there are available resources in the shared transmission resource pool, to allocate transmission resources for one or more of the UEs in the first mode based on the available resources.

Optionally the processor configured to determine at the eNB whether there are available resources in the shared transmission resource pool shared by the UEs in the first mode and the UEs in the second mode is configured: to receive at the eNB resource state information sent by one or more external devices, where the resource state information characterizes the states of transmission resources in the shared transmission resource pool shared by the UEs in the first mode and the UEs in the second mode; and to determine at the eNB whether there are available resources in the shared transmission resource pool, according to the resource state information and information about the transmission resources which have been allocated by the eNB.

Optionally before the transmission resources are allocated for the one or more UEs in the first mode based on the available resources, the processor is further configured: to receive assistance information sent by the one or more external devices, where the assistance information includes at least geographical position information of the external devices.

The processor configured to allocate the transmission resources for the UEs in the first mode based on the available resources is configured: to allocate the transmission resources for the UEs in the first mode based on the available resources and the assistance information.

Optionally the external devices at least include UEs in the first mode and/or UEs in the second mode.

Optionally before the resource state information sent by the one or more external devices is received, the processor is further configured: to send a first instruction message to the UEs in the first mode and/or the UEs in the second mode, to instruct the UEs in the first mode and/or the UEs in the second mode to send the resource state information to the eNB.

Optionally before the first instruction message is sent to the UEs in the first mode and/or the UEs in the second mode, the processor is further configured: to determine the UEs in the first mode and/or the UEs in the second mode which need to send the resource state information to the eNB, among UEs in a coverage area of the eNB; and to send the first instruction message to the UEs in the first mode and/or the UEs in the second mode, to instruct the UEs in the first mode and/or the UEs in the second mode to send the resource state information.

Optionally the available resources are transmission resources with measured power values which are not above a preset power threshold; and/or the available resources are transmission resources the positions of which are not positions indicated by any one successfully decoded SA.

Optionally the measured power values include at least RSRP values.

Optionally the resource state information is information sent by the UEs in the first mode and/or the UEs in the second mode to the eNB via radio resource control signaling.

Optionally the resource state information is information sent by the UEs in the first mode and/or the UEs in the second mode to the eNB in a bitmap; and/or the resource state information is resource position information sent by the UEs in the first mode and/or the UEs in the second mode to indicate the positions of the transmission resources.

Optionally the resource state information includes: resource state information characterizing the states of the transmission resources at a sub-channel level; and/or resource state information characterizing the states of the transmission resources at a sub-channel set level; and/or resource state information characterizing the states of the transmission resources at a sub-frame level.

Optionally the processor is further configured to allocate a dedicated transmission resource pool for the UEs in the first mode, and after the eNB determines whether there are available resources in the shared transmission resource, according to the resource state information, and the information about the transmission resources allocated by the eNB, the processor is further configured: when it is determined that there are no available resources in the shared transmission resource pool, to allocate transmission resources for the UEs in the first mode based on available resources in the dedicated transmission resource pool.

Optionally after the eNB allocates the transmission resources for the one or more UEs in the first mode based on the available resources, the processor is further configured: to send a second indication message, characterizing the transmission resources allocated for the one or more UEs in the first mode, to the UEs in the second mode so that the UEs in the second mode select the transmission resources from the shared transmission resource pool according to the second indication message.

Optionally the processor is further configured: to determine whether there are first UEs with colliding transmission resources among all the UEs; when it is determined that there are the first UEs with the colliding transmission resources among all the UEs, to send a collision message to all the UEs; or when it is determined that there are the first UEs with the colliding transmission resources among all the UEs, to determine whether the first UEs include the UE in the first mode and/or the UE in the second mode, and when it is determined that the first UEs include the UE in the first mode, to allocate a transmission resource for at least one UE in the first mode among the first UE based on the other available resources in the shared transmission resource pool, or if it is determined that the first UEs include the UE in the second mode, to send a third instruction message to the first UEs to instruct at least one UE in the second mode among the first UEs to replace its transmission resource, or when it is determined that the first UEs include the UE in the first mode and the UE in the second mode, to allocate a transmission resource for the UE in the first mode among the first UEs based on the other available resources in the shared transmission resource pool, or to send a third instruction message to the UE in the second mode among the first UEs to instruct the UE in the second mode among the first UEs to replace its transmission resource.

Optionally the processor configured to determine whether there are first UEs with colliding transmission resources among all the UEs is configured: to send a fourth instruction message to the UEs in the second mode to instruct the UEs in the second mode to send information about the transmission resources selected by the UEs in the second mode to the eNB; and to determine whether there are first UEs with colliding transmission resources among all the UEs, according to the information about the transmission resources selected by the UEs in the second mode.

Optionally the processor configured to determine whether there are first UEs with colliding transmission resources among all the UEs is configured: to receive collision information sent by the UE in the first mode and/or the UE in the second mode, where the collision information is information about collision of the transmission resources of the first UEs, determined by the UE in the first mode and/or the UE in the second mode; and to determine whether there are first UEs with colliding transmission resources among all the UEs, according to the collision information.

Based upon the same inventive idea, an embodiment of the invention provides a computer readable storage medium storing computer program configured to perform the method above for allocating a resource.

Since the computer device and the computer readable storage medium according to the embodiment of the invention are configured to perform the method according to the embodiment as illustrated in FIG. 2, reference can be made to the description of the embodiment as illustrated in FIG. 2 for details of the functions to be performed by the respective function modules in the device for allocating resource, and some implementations thereof, and a repeated description thereof will be omitted here.

In the embodiments of the invention, it shall be appreciated that the method and devices as disclosed above can be embodied in other embodiments. For example, the device embodiment as described above is only exemplary, and the device has been divided into the units only according to their logic function, but the device can be divided otherwise in a real implementation; and for example, a plurality of units or components can be combined with each other, or can be integrated into another system, or some features may be omitted or not implemented. Moreover the units of the device can be coupled or communicated directly with each other via some interface, or can be indirectly coupled or communicated electrically or in another form.

The respective function units in the embodiments of the invention can be integrated into a processing unit, or the respective units can be separate physical modules.

If the integrated units are embodied as software function units, and sold or used as separate products, then they may be stored in a computer readable storage medium. Based upon such understanding, a part or all of the technical solutions according to the invention can be embodied in the form of a computer software product, which can be stored in a storage medium, and which includes several instructions to cause a computer device (e.g., a personal computer, a server, a network device, etc.) or a processor to perform a part or all of the steps in the method according to the respective embodiments of the invention. The storage medium includes a Universal Serial Bus (USB) flash disk, a mobile hard disk, a Read-Only Memory (ROM), a Random Access Memory (RAM), a magnetic-disk, an optical disk, or any other medium which can store program codes.

As described above, the foregoing embodiments are only intended to set forth the technical solutions according to the embodiments of the invention in details, but the description of the embodiments above are only intended to facilitate understanding of the method according to the embodiments of the invention, and shall not be construed as limiting the embodiments of the invention thereto. All the variations or alternatives which can readily occur to those skilled in the art shall fall into the claimed scope of the invention.

What is claimed is:

1. A method for allocating resource, the method comprising:
- determining, by an eNB, whether there are available resources in a shared transmission resource pool by UEs in a first mode and UEs in a second mode, wherein transmission resources of the UEs in the first mode are allocated by the eNB, and transmission resources of the UEs in the second mode are selected by the UEs in the second mode from the shared transmission resource pool; and
- when the eNB determines that there are available resources in the shared transmission resource pool, allocating, by the eNB, transmission resources for one or more of the UEs in the first mode based on the available resources;
- wherein determining, by the eNB, whether there are available resources in the shared transmission resource pool shared by the UEs in the first mode and the UEs in the second mode comprises:
- receiving, by the eNB, resource state information sent by one or more external devices, wherein the resource state information characterizes states of transmission resources in the shared transmission resource pool by the UEs in the first mode and the UEs in the second mode; and determining, by the eNB, whether there are available resources in the shared transmission resource pool, according to the resource state information and information about the transmission resources which have been allocated by the eNB;

wherein the external devices at least comprise the UEs in the first mode, and/or the UEs in the second mode;

wherein the resource state information comprises:

resource state information characterizing the states of the transmission resources at a sub-channel level; and/or resource state information characterizing the states of the transmission resources at a sub-channel set level; and/or resource state information characterizing the states of the transmission resources at a sub-frame level.

2. The method according to claim 1, wherein before the eNB allocates the transmission resources for the UEs in the first mode based on the available resources, the method further comprises:

receiving, by the eNB, assistance information sent by the one or more external devices, wherein the assistance information comprises at least geographical position information of the external devices; and allocating, by the eNB, the transmission resources for one or more of the UEs in the first mode based on the available resources comprises:

allocating, by the eNB, the transmission resources for one or more of the UEs in the first mode based on the available resources and the assistance information.

3. The method according to claim 2, wherein before the eNB receives the resource state information sent by the external devices, the method further comprises:

sending, by the eNB, a first instruction message to the UEs in the first mode, and/or the UEs in the second mode to instruct the UEs in the first mode and/or the UEs in the second mode to send the resource state information to the eNB.

4. The method according to claim 3, wherein before the eNB sends the first instruction message to the UEs in the first mode and/or the UEs in the second mode, the method further comprises:

determining, by the eNB, the UEs in the first mode and/or the UEs in the second mode which need to send the resource state information to the eNB, among UEs in a coverage area of the eNB; and sending, by the eNB, the first instruction message to the UEs in the first mode and/or the UEs in the second mode, to instruct the UEs in the first mode and/or the UEs in the second mode to send the resource state information to the eNB.

5. The method according to claim 1, wherein the available resources are transmission resources with measured power values which are not above a preset power threshold, and the measured power values comprise at least RSRP values; and/or the available resources are transmission resources, positions of which are not positions indicated by any one successfully decoded Scheduling Assignment (SA).

6. The method according to claim 1, wherein the resource state information is information sent by the UEs in the first mode and/or the UEs in the second mode to the eNB via radio resource control signaling.

7. The method according to claim 1, wherein the eNB further allocates a dedicated transmission resource pool for the UEs in the first mode, and after the eNB determines whether there are available resources in the shared transmission resource pool, according to the resource state information and the information about the transmission resources which have been allocated by the eNB, the method further comprises:

when the eNB determines that there are no available resources in the shared transmission resource pool, then allocating, by the eNB, transmission resources for the one or more UEs in the first mode based on available resources in the dedicated transmission resource pool.

8. The method according to claim 1, wherein after the eNB allocates the transmission resources for the one or more UEs in the first mode based on the available resources, the method further comprises:

sending, by the eNB, a second indication message, characterizing the transmission resources allocated for the one or more UEs in the first mode, to the UEs in the second mode so that the UEs in the second mode select the transmission resources from the shared transmission resource pool according to the second indication message.

9. The method according to claim 1, wherein the method further comprises:

determining, by the eNB, whether there are first UEs with colliding transmission resources among all the UEs;

when the eNB determines that there are the first UEs with the colliding transmission resources among all the UEs, sending, by the eNB, a collision message to all the UEs; or when the eNB determines that there are the first UEs with the colliding transmission resources among all the UEs, determining, by the eNB, whether the first UEs comprise the UE in the first mode, and/or the UE in the second mode, and when the eNB determines that the first UEs comprise the UE in the first mode, then allocating, by the eNB, a transmission resource for at least one UE in the first mode among the first UEs based on other available resources in the shared transmission resource pool, or when the eNB determines that the first UEs comprise the UE in the second mode, then sending, by the eNB, a third instruction message to the first UEs to instruct at least one UE in the second mode among the first UEs to replace its transmission resource, or when the eNB determines that the first UEs comprise the UE in the first mode, and the UE in the second mode, allocating, by the eNB, a transmission resource for the UE in the first mode among the first UEs based on the other available resources in the shared transmission resource pool, or sending, by the eNB, a third instruction message to the UE in the second mode among the first UEs to instruct the UE in the second mode among the first UEs to replace its transmission resource.

10. The method according to claim 9, wherein determining, by the eNB, whether there are first UEs with colliding transmission resources among all the UEs comprises:

sending, by the eNB, a fourth instruction message to the UEs in the second mode to instruct the UEs in the second mode to send information about the transmission resources selected by the UEs in the second mode to the eNB; and determining, by the eNB, whether there are first UEs with colliding transmission resources among all the UEs, according to the information about the transmission resources selected by the UEs in the second mode.

11. The method according to claim 9, wherein determining, by the eNB, whether there are first UEs with colliding transmission resources among all the UEs comprises:

receiving, by the eNB, collision information sent by the UE in the first mode and/or the UE in the second mode, wherein the collision information is information about collision of the transmission resources of the first UEs, determined by the UE in the first mode, and/or the UE in the second mode; and determining, by the eNB, whether there are first UEs with colliding transmission resources among all the UEs, according to the collision information.

12. A non-transitory computer readable storage medium, storing computer program configured to perform the method according to claim 1.

13. A computer device, comprising a memory, a processor, and computer program stored in the memory and executable on the processor, wherein the processor is configured to execute the computer program:

to determine at an eNB whether there are available resources in a shared transmission resource pool shared by UEs in a first mode and UEs in a second mode, wherein transmission resources of the UEs in the first mode are allocated by the eNB, and transmission resources of the UEs in the second mode are selected by the UEs in the second mode from the shared transmission resource pool; and when it is determined that there are available resources in the shared transmission resource pool, to allocate transmission resources for one or more of the UEs in the first mode based on the available resources;

wherein the processor configured to determine at the eNB whether there are available resources in the shared transmission resource pool by the UEs in the first mode and the UEs in the second mode is configured:

to receive at the eNB resource state information sent by one or more external devices, wherein the resource state information characterizes states of transmission resources in the shared transmission resource pool by the UEs in the first mode and the UEs in the second mode; and to determine at the eNB whether there are available resources in the shared transmission resource pool, according to the resource state information and information about the transmission resources which have been allocated by the eNB;

wherein the external devices at least comprise UEs in the first mode, and/or UEs in the second mode;

wherein the resource state information comprises:

resource state information characterizing the states of the transmission resources at a sub-channel level; and/or resource state information characterizing the states of the transmission resources at a sub-channel set level; and/or resource state information characterizing the states of the transmission resources at a sub-frame level.

14. The computer device according to claim 13, wherein before the transmission resources are allocated for the UEs in the first mode based on the available resources, the processor is further configured:

to receive assistance information sent by the one or more external devices, wherein the assistance information comprises at least geographical position information of the external devices; and the processor configured to allocate the transmission resources for one or more of the UEs in the first mode based on the available resources is configured:

to allocate the transmission resources for one or more of the UEs in the first mode based on the available resources and the assistance information.

15. The computer device according to claim 14, wherein before the resource state information sent by the external devices is received, the processor is further configured:

to send a first instruction message to the UEs in the first mode, and/or the UEs in the second mode to instruct the UEs in the first mode and/or the UEs in the second mode to send the resource state information to the eNB.

16. The computer device according to claim 13, wherein the available resources are transmission resources with measured power values which are not above a preset power threshold, and the measured power values comprise at least RSRP values; and/or the available resources are transmission resources, positions of which are not positions indicated by any one successfully decoded Scheduling Assignment (SA).

* * * * *